United States Patent
Cassidy et al.

[11] Patent Number: 5,820,754
[45] Date of Patent: Oct. 13, 1998

[54] SNAP LATCH FILTER RING FOR A FUEL INJECTOR

[75] Inventors: Daniel G. Cassidy, Findlay; Michael E. Yost, Tiffin; Robert A. Avers, Bowling Green, all of Ohio

[73] Assignee: Kuss Corporation, Findlay, Ohio

[21] Appl. No.: 855,386

[22] Filed: May 13, 1997

Related U.S. Application Data

[63] Continuation-in-part of Ser. No. 573,232, Dec. 15, 1995.
[51] Int. Cl.⁶ .................................................. B01D 35/02
[52] U.S. Cl. .......................... 210/232; 210/485; 210/495; 210/497.01; 210/499
[58] Field of Search ..................................... 210/232, 430, 210/432, 485, 495, 497.01, 499, 484, 459; 239/DIG. 23

[56] References Cited

U.S. PATENT DOCUMENTS

| | | | |
|---|---|---|---|
| 3,633,757 | 1/1972 | Madern | 210/457 |
| 4,014,796 | 3/1977 | Sugiyama et al. | 210/497.01 |
| 4,207,189 | 6/1980 | Geuenich | 210/227 |
| 4,690,757 | 9/1987 | Mathus et al. | 210/232 |
| 4,836,923 | 6/1989 | Popoff et al. | 210/232 |
| 5,169,524 | 12/1992 | Meiritz et al. | 210/232 |
| 5,200,067 | 4/1993 | Sann | 210/232 |
| 5,209,845 | 5/1993 | Sims | 210/232 |
| 5,308,485 | 5/1994 | Griffin et al. | 210/232 |

*Primary Examiner*—Matthew O. Savage
*Attorney, Agent, or Firm*—Brinks Hofer Gilson & Lione

[57] ABSTRACT

A filter ring for use around the circumferential fuel and timing fluid inlets of a diesel engine fuel injector or similar fluid conducting body. In a first preferred embodiment, the filter ring includes first and second semi-annular, band-shaped filter portions, an integrally formed hinge for pivotally interconnecting the filter portions, and a snap latch mechanism for releasably connecting the opposite ends of the filter portions. In a second preferred embodiment, the filter ring includes a pair of substantially identical snap latch mechanisms for detachably interconnecting the filter portions. The snap latch mechanism is formed from a bead or projection that extends substantially along the entire height of the end of one of the filter portions, and a complimentarily shaped groove on the end of the other filter portion. The thickness of the bead and groove is less than the thickness of the opposite ends of the band-shaped filter portions so that the inner diameter of the resulting filter ring seats securely around a complimentarily shaped annular recess in the fuel injector. The hinge and snap latch mechanisms allow the filter ring to be removed without damage, whereupon it may be cleaned and reused many times before requiring replacement.

19 Claims, 5 Drawing Sheets

SNAP LATCH FILTER RING FOR A FUEL INJECTOR

CROSS REFERENCE TO RELATED APPLICATIONS

This application is a continuation-in-part of Ser. No. 08/573,232, filed Dec. 15, 1995.

BACKGROUND OF THE INVENTION

1. Field of the Invention

This invention relates generally to filter rings, and more particularly to band-type filters that are removably disposed around the inlet ports of a fuel injector and retained by snap latches.

2. Related Art

Filter rings for filtering fluid flowing through openings in a fluid conducting body are known in the prior art. Such filters may be used, for example, to filter diesel fuel entering the inlet port in the cylindrical body of a diesel fuel injector. The fuel inlet port of the fuel injector is located within a shallow, annular recess that circumscribes the body of the fuel injector. Such filters typically comprise an annular frame of flexible plastic material having a plurality of uniformly spaced rectangular apertures into which filter screens are secured. The width of the annular recess is slightly larger than the width of the plastic filter frame so that the frame may be closely seated within the recess.

In the prior art, such a filter ring was split on one side along its axis of rotation so that the filter could be easily slid over a fuel injector, and seated in the complimentarily shaped recess containing the fuel inlet ports. The diameter of the split, uninstalled filter was manufactured somewhat larger than the diameter of the fuel injector so that the free ends of the annular frame of the filter would overlap after the filter was seated in the annular recess. The overlapping free ends were then ultrasonically welded together to complete the installation.

While such prior art filter rings have proven themselves to be effective in filtering diesel fuel flowing into fuel injectors, the applicants have noted several shortcomings in the design of such filters. For example, the installation of such filter rings is undesirably complicated and time consuming due to the necessity of having to ultrasonically weld the overlapping, free ends together after the filter is seated in the recess in the fuel injector body. Moreover, such prior art filters cannot be reused when their filter screens become clogged with debris, as happens periodically as a result of the filtration function. The removal process, which involves cutting the filter out of the annular recess in the fuel injector, destroys the filter so that it cannot be reused. Finally, the installation of a new filter involves the same time consuming inconvenience as the initial installation of such a filter, i.e., the new filter must be secured in place and its free ends ultrasonically welded together.

Clearly, there is a need for a ring filter having a latching mechanism that allows it to be easily secured around the annular recess in a fuel injector body without the need for ultrasonic welding. The latching mechanism should further allow the filter to be easily and conveniently removed so that it may be cleaned and reused instead of discarded. Such a latch mechanism must not interfere with the contour of the inner diameter of the filter so that it may accurately seat itself in the annular recess of the fuel injector. Finally, the latch mechanism and filter should be simple and inexpensive to manufacture, yet be capable of securing the ring filter in sealing engagement within the annular recess in the fuel injector.

SUMMARY OF THE INVENTION

A first preferred embodiment of the filter ring comprises first and second semi-annular, band-shaped filter portions, a hinge for pivotally interconnecting one end of each of the filter portions, and a snap latch mechanism for detachably connecting the other end of the filter portions together so that the filter ring may be easily installed and removed. The latch mechanism includes a bead extending substantially along the entire edge of one of the ends of the filter portion, and a groove in the end of the other filter portion for resiliently receiving the bead. The coextensively of the bead and groove with the width of the filter portion ends maximizes the gripping force of the snap latch mechanism when the bead is snapped into the groove.

To maintain an uninterrupted circular contour around the inner diameter of the filter ring, the thickness of the bead and groove of the latch mechanism is less than the thickness of the opposite ends of the band-shaped filter portions. Additionally, the ends of the band-shaped filter portions are formed from a resilient plastic material to implement the snap-action of the latch mechanism. Finally, the groove is preferably complementary in shape to the bead to further enhance the gripping force of the latch mechanism.

Each of the band-shaped filter portions includes a semi-annular frame having a plurality of filter apertures along its circumference. A filtration material in the form of a filter screen is mounted across each of the filter apertures of the semi-annular frames.

To simplify manufacturing, the hinge of the filter ring may simply be an interconnecting piece of bendable plastic material that integrally interconnects the ends of the semi-annular filter portions that are opposite from the latch mechanism. The thickness of this plastic interconnection is less than the thickness of the frames of the filter portions to facilitate bending. The height of the frames of each of the filter portions is, of course, the same as the width of the annular recess of the fuel injector or other fluid conducting body that the filter ring is snapped around so that the filter ring will seat closely in the recess.

The snap latch mechanism of the filter ring of the invention, in combination with the integrally formed hinge, provides a filter ring that is simple in structure and easy and quick to install. Additionally, the snap latch mechanism allows the filter ring to be removed without damage, and then cleaned and reused a number of times.

In a second preferred embodiment, the filter ring is formed from a pair of substantially identical semiannular filter portions. Unlike the first preferred embodiment, a pair of snap latch mechanisms detachably interconnects adjacent respective ends of the semiannular filter portions. In this manner, the filter ring of the second preferred embodiment replaces the hinge of the first preferred embodiment with a second snap latch mechanism. In addition, the snap latch mechanisms are positioned offset from an axis passing through the center of the filter ring to prevent the filter ring from rotating about the fuel injector and to prevent the snap latch mechanisms from separating when the filter ring is installed.

Thus it is an object of the present invention to provide a filter ring having snap latch mechanisms that are conveniently attachable around a fluid conducting opening on the circumference of a fluid conducting body, such as the fuel inlet port of a fuel injector.

These and other aspects and advantages of the invention are described or apparent from the following detailed description of the preferred embodiments and appended drawings wherein like reference numbers refer to the same element, feature or component.

BRIEF DESCRIPTION OF THE DRAWINGS

The preferred embodiments are described with reference to the drawings in which.

DETAILED DESCRIPTION OF THE PREFERRED EMBODIMENTS

Figure 1:
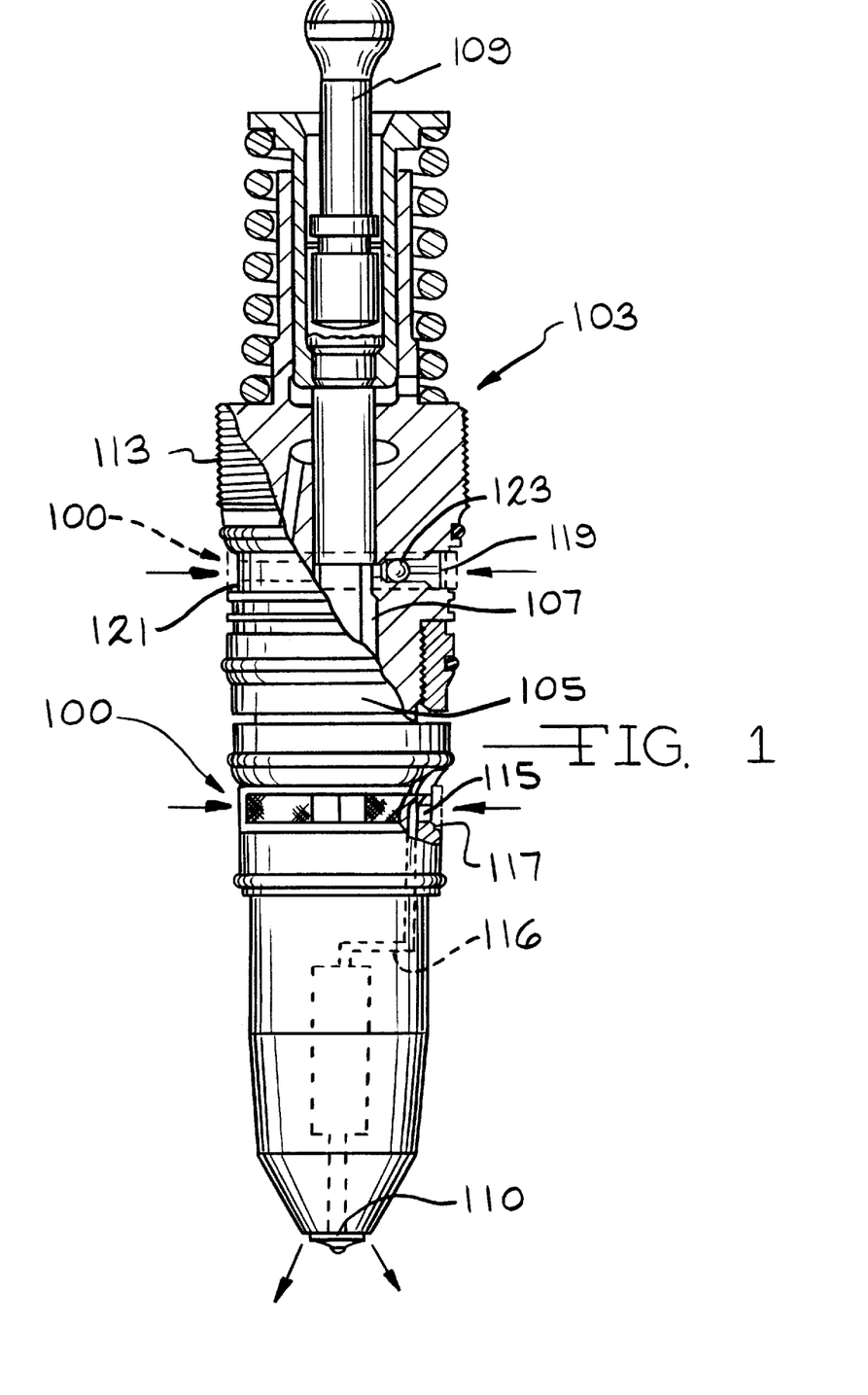
FIG. 1 is a fragmentary, side elevational view in partial section of a fuel injector with two of the band-type filters of the invention installed around the fuel injector.

Referring now to FIG. 1, a filter ring 100 is particularly adapted for use with a fuel injector 103 of the type used to meter fuel to the cylinders of diesel engines. The fuel injector 103 comprises a generally cylindrical injector body 105 having a fluid conducting interior 107 into which a spring loaded plunger 109 is slidably mounted. The upper end of injector body 105 is circumscribed by mounting threads 113 for securing the injector into the block of a diesel engine (not illustrated) and the bottom end of the body 105 includes a fuel nozzle 110. A radially oriented fuel supply port 115 is provided in the mid-section of injector body 105. The fuel supply port 115 communicates with a fluid passageway 116 (shown in phantom) that ultimately conducts pressurized diesel fuel from the exterior of injector body 105 through the fuel nozzle 110. An annular recess 117 complementary in shape to the filter ring 100, circumscribes the injector body 105 at an axial location of the fuel supply port 115. When seated in the annular recess 117, the filter ring 100 filters the pressurized diesel fuel flowing from the exterior of the injector body 105 through the fuel supply port 115 and on through the fuel passageway 116. A timing fluid port 119 is also provided in the injector body 105 above the fuel supply port 115. Similar to the fuel supply port 115, an annular recess 121, complementary in shape to filter the ring 100, circumscribes the injector body 105 at an axial location of the timing fluid port 119. A check valve 123 is disposed within the timing fluid port 119 to prevent any back flow of timing fluids. In operation, a filter ring 100 of the invention (shown in phantom) is also seated in the annular recess 121 to filter timing fluids flowing from the exterior of the injector body 105 into its fluid conducting interior 107.

Figure 2:
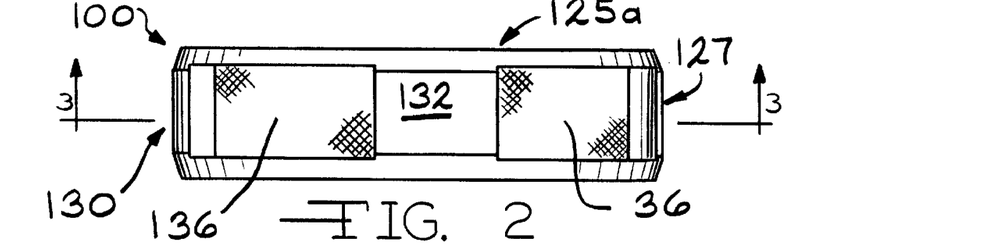
FIG. 2 is a side view of the band-type filter of a first preferred embodiment of the invention.
Figure 3:
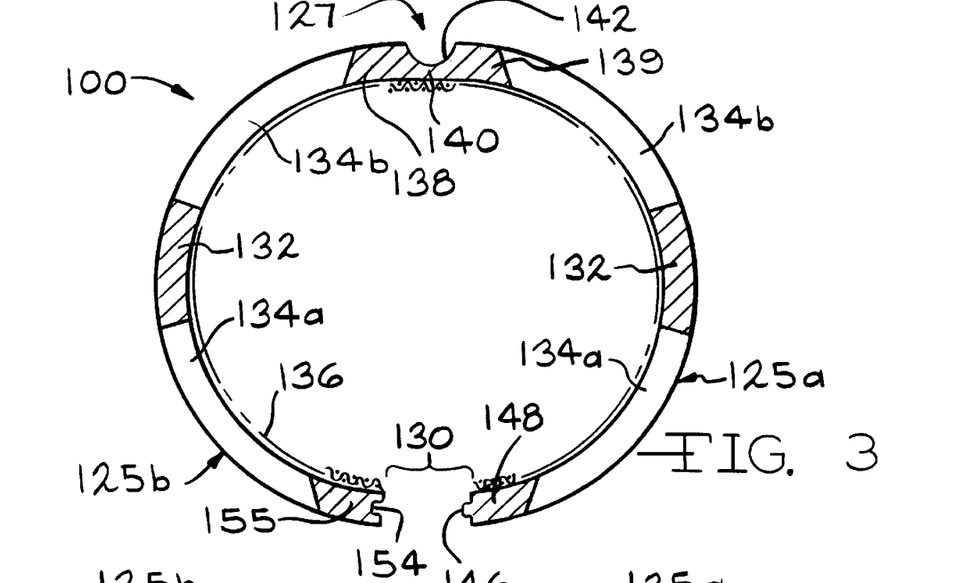
FIG. 3 is a cross-sectional view of the band-type filter of the first preferred embodiment of the invention taken along the line 3—3 of FIG. 2.

Referring now to FIGS. 2 and 3, the filter ring 100 of the invention is formed from a connected pair of semi-annular filter portions 125a and 125b. An integrally-formed hinge 127 pivotally interconnects adjacent respective ends of the two semi-annular filter portions 125a and 125b. A snap latch mechanism 130 releasably interconnects the opposite ends of the filter portions 125a and 125b.

Each of the semi-annular filter portions 125a and 125b comprises a semi-annular frame 132 formed from a fuel resistant plastic material, such as nylon 6/6 stiffened by glass particulate content in the range between about 8% and 20% and preferably a glass particulate content of about 13%. When the percentage of glass particulate in the plastic material is reduced toward zero, operation of the hinge 127 improves, but the plastic material exhibits insufficient rigidity to make the snap latch mechanism 130 work properly. On the other hand, when the percentage of glass particulate is increased to approximately 30%, operation of the snap latch mechanism 130 is improved, but the service life of the hinge 127 is shortened due to the resulting brittleness of the plastic material. Each semi-annular frame 132 includes a pair of rectangular filter apertures 125a and 125b. A circular filter mesh strip 136 is adhered around the inner diameter of each of the semi-annular frames 132 such that each of the filter apertures 125a and 125b effectively frames a portion of the mesh strip 136. In the first preferred embodiment, the mesh strip 136 comprises a stainless steel 90 micron mesh.

Figure 5:
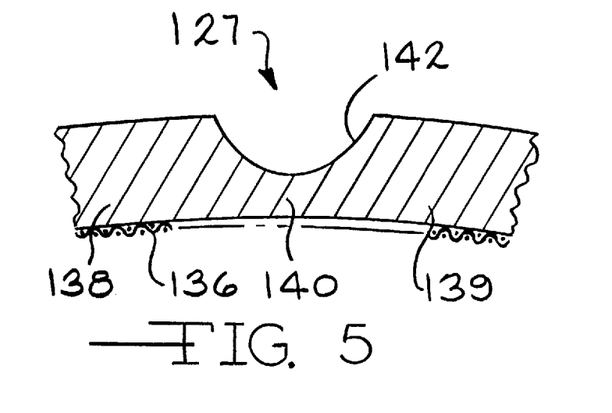
FIG. 5 is an enlarged, fragmentary, sectional view of the hinge of the band-type filter of the first preferred embodiment of the invention.

As best seen in FIGS. 3 and 5, the hinge 127 interconnects the opposing end portions 138, 139 of the frames 132 of opposing semi-annular filter portions 125a and 125b. The hinge 127 is preferably an integrally formed section 140 of the same plastic material forming the semi-annular frames 132 of the filter portions 125a and 125b the only difference being that the section 140 is made thinner by means of groove 142 in order to enhance its bendability. The hinge 127 can assume any one of a number of different structures. The use of the thinned, integral section 140 formed of the same plastic material forming the frames 132 of the filter portions 125a and 125b achieves sufficient pivotal flexibility, allowing the filter ring 100 to be easily installed or removed from the fuel injector 103, while the smooth inner diameter of the filter ring 100 does not interfere with accurate seating. Additionally, because the integral structure of the hinge 127 does not violate the integrity of the walls of the frames 132, it does not disadvantageously admit unfiltered fuel or other liquids when positioned in the annular recesses 117, 121.

Figure 4:
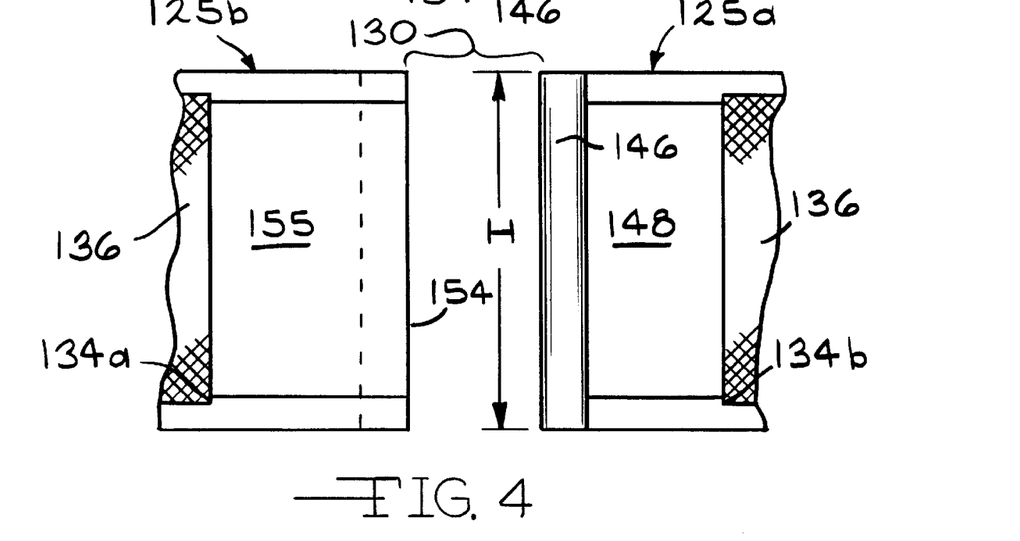
FIG. 4 is an enlarged, fragmentary, side elevational view of the snap latch mechanism of the band-type filter of the first preferred embodiment of the invention.
Figure 6:
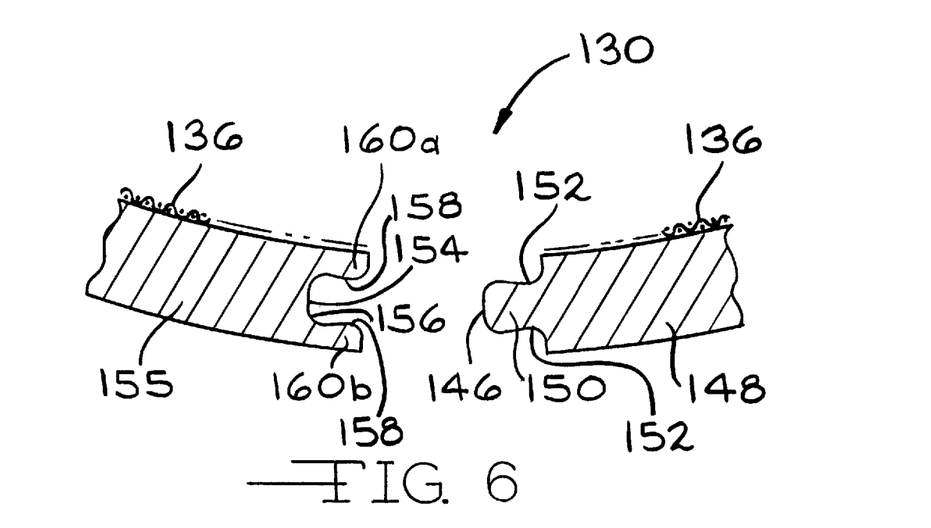
FIG. 6 is an enlarged, fragmentary, sectional view of the snap latch mechanism of the band-type filter of the first preferred embodiment of the invention.

Referring now to FIGS. 4 and 6, the snap latch mechanism 130 comprises a bead 146 extending completely along a height H of an end portion 148 of the semi-annular filter portion 125a. As best seen in FIG. 6, the bead 146 includes an enlarged distal portion 150 flanked by undercut proximal portions 152. Likewise, the snap latch mechanism 130 further includes a groove 154 disposed along the entire height H of the end portion 155 of the opposing filter portion 125b. The groove 154 is complementary in shape to the bead 146, and includes an enlarged proximal recess 156 flanked by tapered distal recesses 158. Because of the resilient nature of the plastic material forming the end portion 155, the tapered distal recesses 158 define resilient snap fingers 160*a* and 160*b* fitting into the undercut proximal portions 152 of the bead 146 when the bead 146 is inserted into the groove 154. Because both the bead 146 and the groove 154 traverse the entire height H of the end portions 148 and 155, respectively, the amount of gripping force the latch mechanism 130 applies is enhanced between the opposing end portions 148 and 156. Furthermore, because the thickness of the bead 146 and the groove 154 are smaller than an overall thickness of the end portions 148 and 155, the snap latch mechanism 130 is prevented from interfering with the circular contour of the inner diameter of the ring filter 100 when portions 125*a* and 125*b* are snapped together. Finally, the complementary shape of the bead 146 with the groove 154 forms a tight fit therebetween resulting from the resiliency of the snap fingers 160*a* and 160*b* and prevents unfiltered fluid from radially flowing through the filter ring 100 when closed around annular recesses 117 and 121 circumscribing the fuel injector 103 or other fluid conducting body.

When the filter ring 100 is initially installed, the snap latch mechanism 130 is unsnapped to bring the filter ring 100 into the position shown in FIG. 3. Then, the filter ring 100 is slid over the body of fuel injector 103 (or other fluid conducting body) and snapped closed. When snapped closed, the filter ring 100 effectively filters a radial flow of pressurized fluid by directing this fluid through the filter apertures 125*a* and 125*b* on each of its two semi-annular filter portions 125*a* and 125*b*. When the filter apertures 125*a* and 125*b* become obstructed due to the accumulation of particulate foreign matter, the system operator can unsnap the filter ring 100 into the position illustrated in FIG. 3 and remove it from the fuel injector 103 or other fluid conducting body. The filter apertures 125*a* and 125*b* may then be cleaned (for example, by compressed air) and the filter ring 100 may be reinstalled in a similar manner as when initially installed without destroying or impairing the structure of the filter ring 100.

Referring now to FIGS. 7 through 12, a filter ring 200 according to a second preferred embodiment of the invention will now be described.

Figure 7:
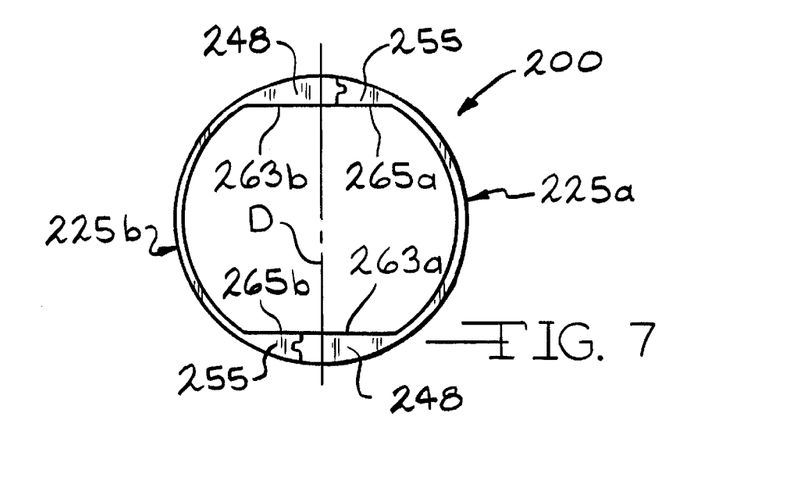
FIG. 7 is a top plan view of the band-type filter of a second preferred embodiment of the invention.
Figure 11:
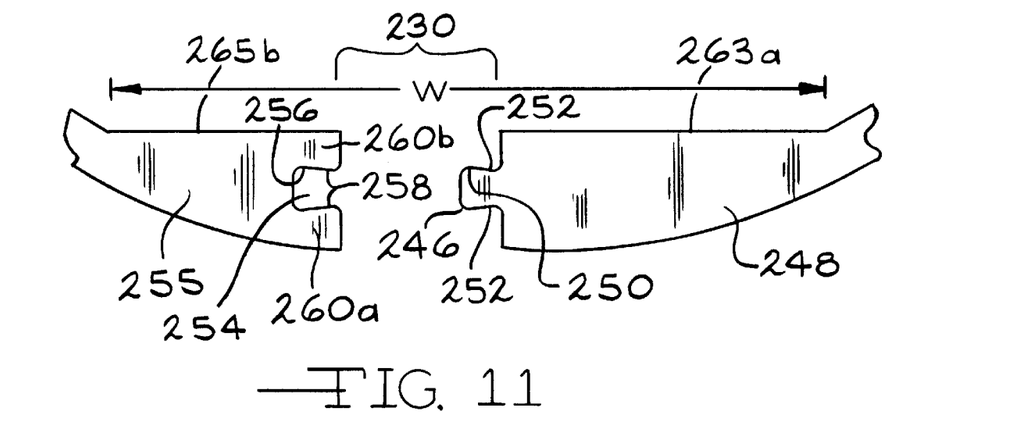
FIGS. 11 and 12 are top plan views of the snap latch mechanisms of the band-type filter of the second preferred embodiment of the invention.
Figure 12:
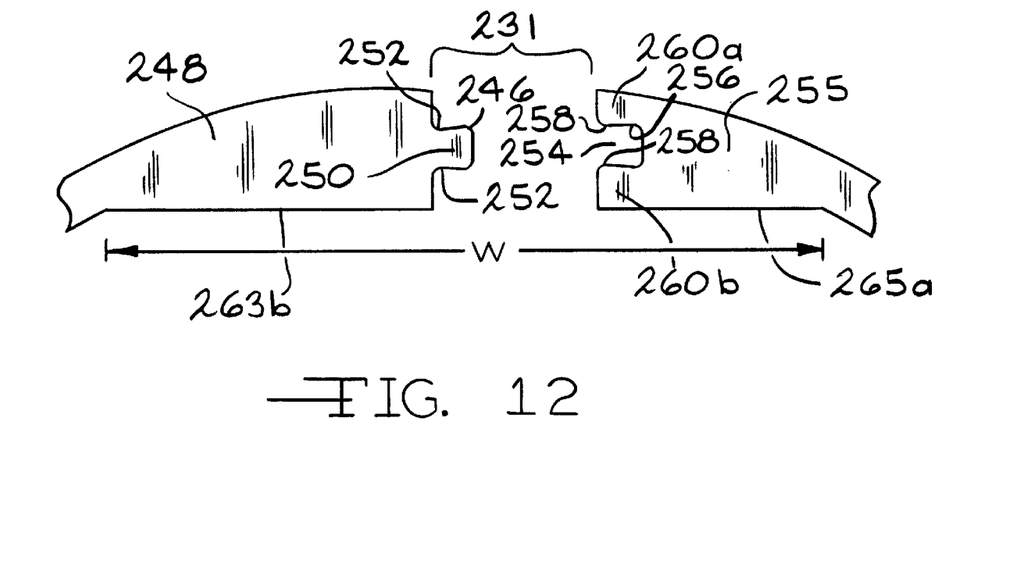

As illustrated in FIG. 7, the filter ring 200 is formed from a pair of substantially identical semiannular filter portions 225*a* and 225*b*. Each semiannular filter portion 225*a* and 225*b* includes end portions 248 and 255. The end portion 248 of the filter portion 225*a* includes an interior chordal face 263*a* and the end portion 255 of the filter portion 225*a* also includes an interior chordal face 265*b*. Likewise, the end portion 255 of the filter portion 225*a* includes an interior chordal face 265*a* and the end portion 248 of the filter portion 225*b* includes a chordal face 263*b*. The chordal faces 263*a*, 265*b*, 265*a* and 263*b* are complementary in shape to the annular recesses 117 and 121 of the fuel injector 103 so as to prevent the filter ring 200 from rotating around the fuel injector 103 or other fluid conducting body and to form a tight fit therebetween, thereby preventing unfiltered fluid from flowing around the filter ring 200. As shown in FIGS. 11 and 12, the chordal faces 263*a* and 265*b* of the snap latch mechanism 230 and the chordal faces 265*a*, 263*b* of the snap latch mechanism 231 extend along a width, W, of the end portions 248, 255.

Unlike the filter ring 100 of the first preferred embodiment, the filter ring 200 of the second preferred embodiment includes a pair of snap latch mechanisms 230 and 231 that detachably interconnect adjacent respective ends of the filter portions 225*a* and 225*b*. Thus, the filter ring 200 of the second preferred embodiment replaces the hinge 127 of the filter ring 100 of the first preferred embodiment with a snap latch mechanism.

Figure 8:
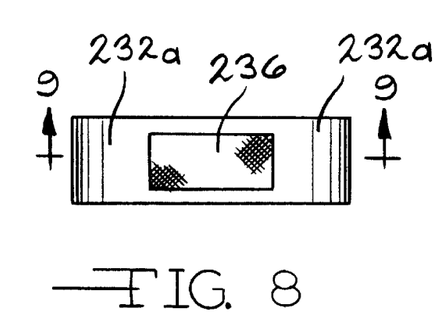
FIG. 8 is a side elevational view of the band-type filter of the second preferred embodiment of the invention.
Figure 9:
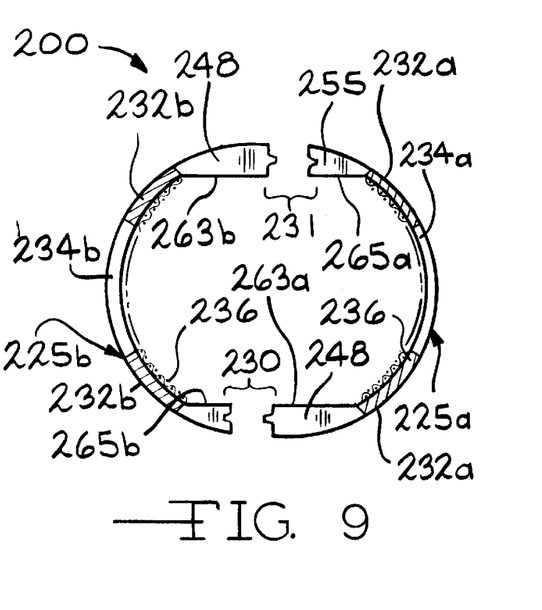
FIG. 9 is a cross-sectional view of the band-type filter of the second preferred embodiment of the invention taken along the line 8—8 of FIG. 8.

Referring now to FIGS. 8 and 9, each of the semi-annular filter portions 225*a* and 225*b* comprise a semi-annular frame 232*a* and 232*b*, respectively, formed from a fuel resistant plastic material, such as polyester resin or nylon 6/6 stiffened with glass particulate, as in the first preferred embodiment, or the frame 232 may be formed of any class of fuel tolerant thermoplastic polyamides capable of being injection molded. In the first preferred embodiment of the invention, the service life of the hinge 127 may be shortened when the percentage of glass particulate in the nylon material is increased to approximately 30%. However, one advantage of the second preferred embodiment of the invention is that the hinge 127 is replaced with a snap latch mechanism. Thus, the glass particulate content in the fuel resistant plastic material forming each semi-annular frame 232 of the semi-annular filter portions 225*a* and 225*b* of the filter ring 200 is not so limited.

Each semi-annular frame 232*a* and 232*b* includes rectangular filter apertures 234*a* and 234*b*, respectively. A circular filter mesh strip 236 is secured around the inner diameter of each semi-annular frame 232*a* and 232*b*, such that each filter aperture 234*a* and 234*b* effectively frames a portion of the mesh strip 236. In the second embodiment, the mesh strip 236 comprises a stainless steel mesh having a pore size of 105 microns. However, it should be understood that the invention is not limited to a particular pore size and that the invention can be practiced with mesh strips 236 of various pore sizes.

Figure 10:
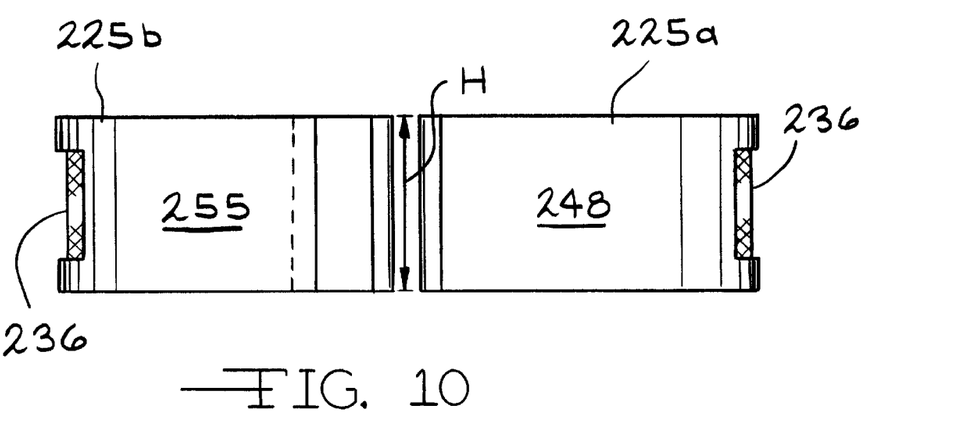
FIG. 10 is an enlarged, side elevational view of one of the snap latch mechanisms of the band-type filter of the second preferred embodiment of the invention.

Referring now to FIGS. 10 through 12, each snap latch mechanism 230 and 231 comprises a bead or projection 246 extending completely along the height H of the end portion 248. The bead 246 includes an enlarged distal portion 250 flanked by undercut proximal portions 252. Likewise, each snap latch mechanism 230 and 231 further includes a groove 254 disposed along the entire height H of the end portion 255 of the opposing filter portion 225*b*. The groove 254 is complementary in shape to the bead or projection 246 and includes an enlarged proximal recess 256 flanked by tapered distal recesses 258. Because of the resilient nature of the plastic material forming the end portions 248 and 255, the tapered distal recesses 258 define resilient snap fingers 260*a* and 260*b* fitting into the undercut proximal portions 252 of the bead 246 when the bead 246 is inserted into the groove 254.

Because both the bead 246 and the groove 254 traverse the entire height H of the end portions 248 and 255, respectively, the amount of gripping force each latch mechanism 230 and 231 applies is enhanced between the opposing end portions 248 and 256. Furthermore, because the thickness of the bead 246 and the groove 254 are smaller than an overall thickness of the end portions 248 and 255, each snap latch mechanism 230 and 231 is prevented from interfering with the circular contour of the inner diameter of the ring filter 200 when the portions 225*a* and 225*b* are snapped together. Finally, the complementary shapes of the bead or projection 246 and the groove 254 form a tight fit therebetween due to the resiliency of snap fingers 260*a* and 260*b*, thereby preventing unfiltered fluid from radially flowing through the filter ring 200 when closed around the annular recesses 117 and 121 circumscribing the fuel injector 103 or other fluid conducting body.

Referring now to FIG. 7, each snap latch mechanism 230 and 231 is offset from a line of diameter D which is also perpendicular to the chordal faces 263*a*, 265*b*, 265*a* and 263*b*, preferably by a distance of approximately 2.0 mm, in a direction normal to the line of diameter D illustrated in FIG. 7. In this manner, the amount of fluid force exerted by the fuel does not exceed the amount of gripping force of each snap latch mechanism 230 and 231, thereby further preventing each snap latch mechanism 230 and 231 from separating when the filter ring 200 is installed around fuel injector 103.

When the filter ring 200 is initially installed, the snap latch mechanisms 230 and 231 are unsnapped to bring the filter ring 200 into the position shown in FIG. 9. Then, each semi-annular filter portion 225*a* and 225*b* of the filter ring 200 are slid over the body of the fuel injector 103 (or other fluid conducting body) and snapped together into the position shown in FIG. 7. To properly position the filter ring 200 around the fuel injector 103, it should be noted that the chordal faces 265*a* , 263*b* and 263*a*, 265*b* of the filter portions 225*a* and 225*b* should be placed within the annular recesses 117 and 121 of the fuel injector 103, respectively. When each snap latch mechanism 230 and 231 is snapped closed, the filter ring 200 effectively filters a radial flow of pressurized fluid by directing this fluid through the filter apertures 234*a* and 234*b* on each of its two semi-annular filter portions 225*a* and 225*b*.

When the filter apertures 234*a* and 234*b* become obstructed due to the accumulation of particulate foreign matter, the system operator can unsnap the filter ring 200 into the position illustrated in FIG. 9 and remove it from the fuel injector 103 or other fluid conducting body. The filter apertures 234*a* and 234*b* may then be cleaned (for example, by compressed air) and the filter ring 200 may be reinstalled in a similar manner as when initially installed without destroying or impairing the structure of the filter ring 200.

While this invention has been described in conjunction with specific embodiments, it is evident that many alternatives, modifications and variations will be apparent to those skilled in the art. Accordingly, the preferred embodiments of the invention as set forth herein are intended to be illustrative, rather than limiting. Various changes may be made axis without departing from the spirit and scope of the invention as defined in the following claims.

What is claimed is:

1. A filter ring attachable around one or more circumferential openings in a fluid conducting body for filtering fluids flowing through said openings, said filter ring comprising:
   a first band-shaped filter portion having a first end and a second end;
   a second band-shaped filter portion having a first end and a second end, said first and second filter portions circumscribing the one or more circumferentially spaced openings in the fluid conducting body; and
   snap latch mechanisms for detachably connecting the first end of said first filter portion with the second end of said second filter portion, and the second end of said first filter portion with the first end of said second filter portion.

2. The filter ring of claim 1, wherein said snap latch mechanisms include a groove in the first end of said first band-shaped filter portion and a bead in the second end of said second band-shaped filter portion, and a groove in the first end of said second band-shaped filter portion and a bead in the second end of said first band-shaped filter portion.

3. The filter ring of claim 2, wherein the groove is complementary in shape to the bead.

4. The filter ring of claim 2, wherein the bead and the groove of said snap latch mechanisms extends an entire length of their respective band-shaped filter portions.

5. The filter ring of claim 2, wherein a thickness of the bead and the groove is less than a thickness of their respective band-shaped filter portions.

6. The filter ring of claim 1, wherein said first and second band-shaped filter portions are semi-annular in shape.

7. The filter ring of claim 1, wherein each first and second band-shaped filter portion includes a frame having at least one filtration aperture having filtration material mounted over the at least one filtration aperture.

8. The filter ring of claim 7, wherein said filtration material is a screen mesh.

9. The filter ring of claim 8, wherein said screen mesh has a pore size of approximately 90 microns.

10. The filter ring of claim 7, wherein said frame is formed from a resilient plastic material.

11. The filter ring of claim 7, wherein an inner diameter of the filter ring formed by said first and second semi-annular filter portions is the same at all points along the inner circumference of said ring.

12. A filter ring attachable around a fluid conducting body, said filter ring comprising:
   a first band-shaped filter portion having a first end and a second end;
   a second band-shaped filter portion having a first end and a second end;
   a first snap latch mechanism for detachably connecting the first end of said first filter portion and the second end of said second filter portion; and
   a second snap latch mechanism for detachably connecting the second end of said first filter portion and the first end of said second filter portion.

13. The filter ring of claim 12, wherein said first snap latch mechanism includes a projection extending substantially along the first end of said first filter portion, and a groove extending along the second end of said second filter portion for resiliently receiving said projection.

14. The filter ring of claim 12, wherein said second snap latch mechanism includes a groove extending substantially along the second end of said first filter portion, and a projection extending along the first end of said second filter portion for resiliently receiving said projection.

15. The filter ring of claim 12, wherein said fluid conducting body includes an annular recess for receiving said filter ring, and wherein said first and second band-shaped filter portions form an annulus that is complementary in shape to said recess when said first and second snap latch mechanisms interconnect said first and second band-shaped filter portions.

16. The filter ring of claim 12, wherein each first and second band-shaped filter portion defines a frame.

17. The filter ring of claim 16, wherein each frame includes at least one filtration aperture and a filtration screen mounted over the at least one filtration aperture.

18. The filter ring of claim 17, wherein said screen mesh has a pore size of approximately 105 microns.

19. The filter ring of claim 12, wherein said first and second snap latch mechanisms are positioned offset from an axis passing through a center of said filter ring.

* * * * *

UNITED STATES PATENT AND TRADEMARK OFFICE
CERTIFICATE OF CORRECTION

PATENT NO.   : 5,820,754
DATED         : October 13, 1998
INVENTOR(S) : Daniel G. Cassidy, Michael E. Yost and Robert A. Avers It is certified that error appears in the above-identified patent and that said Letters Patent is hereby corrected as shown below:

Column 2, line 12, delete "coextensively" and insert - -coextensiveness - -
Column 4, line 29, delete "125a and 125b" and insert - -134a and 134b - -
Column 4, line 32, delete "125a and 125b" and insert - - 134a and 134b - -
Column 5, line 25, delete "125a and 125b" and insert - - 134a and 134b - -
Column 5, line 27, delete "125a and 125b" and insert - - 134a and 134b - -
Column 5, line 32, delete "125a and 125b" and insert - - 134a and 134b - -
Column 5, line 45, delete "225a" and insert - - 225b - -

Signed and Sealed this

Second Day of March, 1999

Attest:

Q. TODD DICKINSON

Attesting Officer

Acting Commissioner of Patents and Trademarks